US012152904B2

(12) United States Patent
Xiong et al.

(10) Patent No.: US 12,152,904 B2
(45) Date of Patent: Nov. 26, 2024

(54) SINGLE STAR-BASED ORIENTATION METHOD USING DUAL-AXIS LEVEL SENSOR

(71) Applicant: BEIJING AEROSPACE INSTITUTE FOR METROLOGY AND MEASUREMENT TECHNOLOGY, Beijing (CN)

(72) Inventors: Kun Xiong, Beijing (CN); Yinxiao Miao, Beijing (CN); Chunxi Wang, Beijing (CN); Qiufang Shang, Beijing (CN); Shengquan Tang, Beijing (CN); Tao Wang, Beijing (CN); Yue Wu, Beijing (CN); Zhen Wang, Beijing (CN); Qiang Wang, Beijing (CN); Ye Tang, Beijing (CN); Zhengjie Wang, Beijing (CN)

(73) Assignee: Beijing Aerospace Institute for Metrology and Measurement Technology, Beijing (CN)

( * ) Notice: Subject to any disclaimer, the term of this patent is extended or adjusted under 35 U.S.C. 154(b) by 243 days.

(21) Appl. No.: 17/714,829

(22) Filed: Apr. 6, 2022

(65) Prior Publication Data
US 2022/0236078 A1 Jul. 28, 2022

(30) Foreign Application Priority Data

Nov. 15, 2021 (CN) .......................... 202111348637.6

(51) Int. Cl.
*G01C 25/00* (2006.01)
*G01C 21/02* (2006.01)
*B64G 1/36* (2006.01)
*G01S 3/786* (2006.01)

(52) U.S. Cl.
CPC .......... *G01C 25/00* (2013.01); *G01C 21/025* (2013.01); *B64G 1/361* (2013.01); *G01S 3/7867* (2013.01)

(58) Field of Classification Search
CPC ...... G01C 21/025; B64G 1/361; G01S 3/7867
See application file for complete search history.

(56) References Cited

U.S. PATENT DOCUMENTS

| | | | | |
|---|---|---|---|---|
| 5,508,932 A | * | 4/1996 | Achkar | B64G 1/36 701/13 |
| 11,901,630 B1 | * | 2/2024 | Cherrette | H01Q 3/20 |
| 2004/0144910 A1 | * | 7/2004 | Peck | G01S 5/163 250/206.2 |
| 2010/0283840 A1 | * | 11/2010 | Belenkii | G01C 21/02 356/8 |
| 2015/0042793 A1 | * | 2/2015 | Belenkii | G01S 3/7867 348/143 |

(Continued)

FOREIGN PATENT DOCUMENTS

| | | | |
|---|---|---|---|
| CN | 103466103 A | 12/2013 | |
| CN | 110498063 A | 11/2019 | |
| CN | 109459059 B * | 8/2022 | ............. G01C 25/00 |

OTHER PUBLICATIONS

Ashai et al., A Bibliometric Perspective Survey of Astronomical Object Tracking System, Feb. 15, 2021, Library Philosophy and Practice (e-journal) (Year: 2021).*

*Primary Examiner* — Russell Frejd
*Assistant Examiner* — Sara J Lewandroski (57) ABSTRACT

Disclosed is a single star-based orientation method using a dual-axis level sensor, which includes a calibration process and an actual calculation process.

4 Claims, 2 Drawing Sheets

(56) References Cited

U.S. PATENT DOCUMENTS

2015/0367966 A1* 12/2015 Judd .................. B64G 1/244
  701/13
2016/0041265 A1* 2/2016 Waldron .............. G01S 3/7867
  250/203.6

* cited by examiner

SINGLE STAR-BASED ORIENTATION METHOD USING DUAL-AXIS LEVEL SENSOR

CROSS-REFERENCE TO RELATED APPLICATIONS

This application claims the benefit of priority from Chinese Patent Application No. 202111348637.6, filed on Nov. 15, 2021. The content of the aforementioned applications, including any intervening amendments thereto, is incorporated herein by reference in its entirety.

TECHNICAL FIELD

This application relates to absolute attitude measurement, and more particularly to a single star-based orientation method using a dual-axis level sensor.

BACKGROUND

Servo star sensors are designed to enable the all-day observation during the measurement of astronomical position and attitude on the ground. By means of the small view field of the servo star sensors, the celestial objects are observable in the daytime, and the observation of astronomical objects is changed from passive capture to active star-seeking. The active star-seeking process includes astronomical prediction, motion compensation and image stabilization-based tracking, and is difficult to implement. According to the principle of attitude solution, it is necessary to observe at least two non-parallel space vectors to obtain the attitude information. In view of this, with regard to the servo star sensors, the observation target needs to be continuously changed to achieve the attitude measurement.

Regarding the current servo star sensor-based orientation, there is still a lack of a single star observation-based orientation strategy, and the dual-axis level sensor information-based fusion method is also absent.

For the existing servo star sensors, the active star-seeking is usually adopted for the attitude measurement, in which a priori information is introduced to predict the orientation of 3 to 5 celestial objects, and a servo is guided by the outline attitude information for observation. The active star-seeking has acceptable reliability under quasi-static conditions; under dynamic conditions, affected by the carrier motion, the later observation targets are prone to fall out of the observation field of view. Though some star sensors use inertial components such as gyroscopes to compensate for attitude changes of the carrier during the observation, the small observation view field still fails to enable the reliable observation.

A miss distance is used in a control strategy of the single star tracking for control feedback, which greatly enhances the control robustness. This method is often used in some geodetic astronomical surveys for orientation, but the fine adjustment of the measuring instrument is strictly required, which is difficult to achieve for dynamic carriers.

In summary, there is still a lack of a convenient single star-based orientation method that can reach the stable and reliable orientation with high update rate under dynamic conditions. A multi-star simultaneous solution is not only complicated in control strategy, but also difficult in the conversion of the calculation reference system, failing to obtain high-precision orientation information.

SUMMARY

In order to solve the above-mentioned problems, the present disclosure provides a single star-based orientation method using a dual-axis level sensor, which enables the orientation survey with a single astronomical object and improves a data update rate and measurement accuracy of astronomical orientation by measuring a redundant non-level information of the dual-axis level sensor.

Technical solutions of this application are described as follows.

This application provides a single star-based orientation method using a dual-axis level sensor, comprising:

(S1) denoting any two orthogonal side surfaces of a hexahedron on a star sensor as a first side surface and a second side surface, respectively; denoting a component of a vector $v_{right}$ on an $X_n$-axis of a quasi-horizontal reference system as $t_4$; and denoting a component of the vector $v_{right}$ on a $Z_n$-axis of the quasi-horizontal reference system as $t_6$;

wherein the vector $v_{right}$ is obtained by rotating a normal vector of the second side surface around the $Z_n$-axis of the quasi-horizontal reference system by a preset azimuth angle $\theta_{dir}^{right}$;

(S2) calculating the $t_4$ and $t_6$ through the following equations:

$$\begin{cases} t_4 = -(\sin\alpha\sin(\Delta\theta_x^{pitch} - \theta_x^{pitch}) + \cos\alpha\sin(\Delta\theta_y^{pitch} - \theta_y^{pitch})) \\ t_6 = (\cos\alpha\sin(\Delta\theta_x^{pitch} - \theta_x^{pitch}) - \sin\alpha\sin(\Delta\theta_y^{pitch} - \theta_y^{pitch})) \end{cases};$$

wherein $\alpha$ is an angle between an $X_s$-axis of a dual-axis level sensor reference system and an X-axis of a hexahedron reference system on the star sensor; $\theta_x^{pitch}$ is a measurement reading of the dual-axis level sensor on the $X_s$-axis; $\theta_y^{pitch}$ is a measurement reading of the dual-axis level sensor on a $Y_s$-axis of the dual-axis level sensor reference system; $\Delta\theta_x^{pitch}$ is a bias of the dual-axis level sensor on the $X_s$-axis; and $\Delta\theta_y^{pitch}$ is a bias of the dual-axis level sensor on the $Y_s$-axis;

(S3) denoting an observation vector of a single astronomical object in the hexahedron reference system as $v_{PRI}$ and denoting a reference vector of the single astronomical object in an inertial reference system as $v_{GND}$, wherein the reference vector of the single astronomical object is obtained from a star catalog, and the $v_{GND}$ and $v_{PRI}$ satisfy the following equation:

$$R_z(\theta_z) \cdot R_x(\theta_x) \cdot R_y(\theta_y) \cdot v_{GND} = v_{PRI};$$

wherein $R_y(\theta_y)$ denotes that the reference vector $v_{GND}$ rotates around a Y-axis of the hexahedron reference system by an azimuth angle $\theta_y$; $R_x(\theta_x)$ denotes that the reference vector $v_{GND}$ rotates around the X-axis of the hexahedron reference system by a pitch angle $\theta_x$; and $R_z(\theta_z)$ denotes that the reference vector $v_{GND}$ rotates around a Z-axis of the hexahedron reference system by a roll angle $\theta_z$;

(S4) calculating the pitch angle $\theta_x$ and the roll angle $\theta_z$ according to the $t_4$ and $t_6$ through the following equations:

$$\begin{cases} \theta_x = -\arcsin t_6 \\ \theta_z = -\arcsin(t_4/\cos\theta_x) \end{cases};$$

and (S5) letting $v_{GND0} = R_x(-\theta_x) \cdot R_z(-\theta_z) \cdot \theta_{PRI}$ and obtaining $v_{GND} = R_y(-\theta_y) \cdot v_{GND0}$; and calculating the azimuth angle $\theta_y$ through the following equation to complete a single star-based orientation:

$$\theta_y = \arctan2\left(\frac{v1 \cdot v6 - v3 \cdot v4}{v4^2 + v6^2}, \frac{v1 \cdot v4 + v3 \cdot v6}{v4^2 + v6^2}\right);$$

wherein [v1 v2 v3]=$v_{GND}$; v1-v3 are components of the $v_{GND}$ on three axes of the inertial reference system, respectively; [v4 v5 v6]$^T$=$v_{GND0}$; and v4-v6 are components of the $v_{GND0}$ on the $X_n$-axis, the $Y_n$-axis and the $Z_n$-axis, respectively.

In some embodiments, in the step (S1), the preset azimuth angle $\theta_{dir}^{right}$ is set through steps of:

defining the $X_n$-axis of the quasi-horizontal reference system as a projection of the X-axis of the hexahedron reference system on a horizontal plane; defining a $Y_n$-axis of the quasi-horizontal reference system such that the $Y_n$-axis is orthogonal to the $X_n$-axis on the horizontal plane and a $Z_n$-axis of the quasi-horizontal reference system satisfies a right-hand rule, and has a general upward pointing direction;

measuring, by a first theodolite and a second theodolite, a normal pitch angle $\theta_{pitch}^{front}$ of the first side surface and a normal pitch angle $\theta_{pitch}^{right}$ of the second side surface, respectively; wherein in the quasi-horizontal reference system, a normal vector $v_{front}$ of the first side surface is expressed as:

$$v_{front} = R_y(\theta_{pitch}^{front}) \cdot \begin{bmatrix} 0 \\ 0 \\ 1 \end{bmatrix} = \begin{bmatrix} vf1 \\ 0 \\ vf3 \end{bmatrix};$$

wherein $R_y(\theta_{pitch}^{front})$ denotes that a vector [0 0 1] rotates around a $Y_n$-axis of the quasi-horizontal reference system by the normal pitch angle $\theta_{pitch}^{front}$; and $vf1,0$ and $vf3$ are components of the normal vector $v_{front}$ on the $X_n$-axis, $Y_n$-axis and $Z_n$-axis, respectively;

a normal vector $\overline{v}_{right}$ of the second side surface without rotating by the preset azimuth angle $\theta_{dir}^{right}$ is expressed as:

$$\overline{v}_{right} = R_y(\theta_{pitch}^{right}) \cdot \begin{bmatrix} 0 \\ 0 \\ 1 \end{bmatrix} = \begin{bmatrix} vf1 \\ 0 \\ vf3 \end{bmatrix};$$

wherein $R_y(\theta_{pitch}^{right})$ denotes that the vector [0 0 1] rotates around the $Y_n$-axis of the quasi-horizontal reference system by the normal pitch angle $\theta_{pitch}^{right}$; and $vr1,0$ and $vr3$ are components of the normal vector $\overline{v}_{right}$ on the $X_n$-axis, $Y_n$-axis and $Z_n$-axis, respectively;

supposing that the vector $v_{right}$ is obtained by rotating the vector $\overline{v}_{right}$ by the preset azimuth angle $\theta_{dir}^{right}$ and expressing the vector $v_{right}$ as follows:

$$v_{right} = R_z(\theta_{dir}^{right}) \cdot \begin{bmatrix} vr1 \\ 0 \\ vr3 \end{bmatrix} = \begin{bmatrix} vr1 \cdot \cos\theta_{dir}^{right} \\ -vr1 \cdot \sin\theta_{dir}^{right} \\ vr3 \end{bmatrix};$$

wherein $R_z(\theta_{dir}^{right})$ denotes that a vector [vr 0 vr3] rotates around the $Z_n$-axis by the preset azimuth angle $\theta_{dir}^{right}$; and according to an orthogonal relationship between the normal vector $v_{front}$ and the normal vector $v_{right}$, obtaining the following equation:

$$\left(\theta_{dir}^{right} = a\cos\left(\frac{-vf3 \cdot vr3}{vf1 \cdot vr1}\right)\right);$$

In some embodiments, an axis of a measuring lens barrel of the first theodolite coincides with a normal of the first side surface of the hexahedron, and an axis of a measuring lens barrel of the second theodolite coincides with a normal of the second side surface of the hexahedron.

In some embodiments, in the step (S2), the angle α, the bias $\Delta\theta_x^{pitch}$ and the bias $\Delta\theta_y^{pitch}$ are obtained through steps of:

defining the $X_n$-axis of the quasi-horizontal reference system as a projection of the X-axis of the hexahedron reference system on a horizontal plane; defining a $Y_n$-axis of the quasi-horizontal reference system such that the $Y_n$-axis is orthogonal to the $X_n$-axis on the horizontal plane and the $Z_n$-axis of the quasi-horizontal reference system satisfies a vertically-upward right-hand rule; allowing the dual-axis level sensor reference system to be coplanar with the hexahedron reference system; and expressing a direction vector of the $X_s$-axis in the hexahedron reference system as [cos α 0 –sin α] and a direction vector of the $Y_s$-axis in the hexahedron reference system as [–sin α 0 –cos α];

denoting a normal vector of the first side surface as $v_{front}$; and obtaining a normal vector $v_{up}$ of a third side surface orthogonal to both the first side surface and the second side surface by cross product, expressed as:

$v_{up} = v_{right} \times v_{front}$;

obtaining a transformation matrix $R_{GND2PRI}$ from the quasi-horizontal reference system to the hexahedron reference system, expressed as:

$R_{GND2PRI} = [v_{front} v_{right} v_{up}]$;

obtaining a transpose matrix of the transformation matrix $R_{GND2PRI}$, expressed as:

$$R_{PRI2GND} = R_{GND2PRI}^T = \begin{bmatrix} t_1 & t_2 & t_3 \\ t_4 & t_5 & t_6 \\ t_7 & t_8 & t_9 \end{bmatrix};$$

wherein T represents a transposition operation; and $t_1$-$t_9$ are elements of the transformation matrix $R_{GND2PRI}$;

acquiring a direction vector $v_{x_s}$ of the $X_s$-axis in the quasi-horizontal reference system, expressed as:

$$v_{X_s} = \begin{bmatrix} t_1\cos\alpha - t_3\sin\alpha \\ t_4\cos\alpha - t_6\sin\alpha \\ t_7\cos\alpha - t_9\sin\alpha \end{bmatrix};$$

acquiring a direction vector $v_{y_s}$ of the $Y_s$-axis in the quasi-horizontal reference system, expressed as:

$$v_{Y_s} = \begin{bmatrix} -t_1\sin\alpha - t_3\cos\alpha \\ -t_4\sin\alpha - t_6\cos\alpha \\ -t_7\sin\alpha - t_9\cos\alpha \end{bmatrix};$$

building relations between $t_4$ and $t_6$ according to the direction vector $v_x$, and the direction vector $v_y$, expressed as:

$$\begin{cases} \sin\left(\Delta\theta_x^{pitch} - \theta_x^{pitch}\right) = t_4\cos\alpha - t_6\sin\alpha \\ \sin\left(\Delta\theta_y^{pitch} - \theta_y^{pitch}\right) = -t_4\sin\alpha - t_6\cos\alpha \end{cases};$$

according to the relations between $t_4$ and $t_6$, obtaining a relation between the measurement reading $\theta_x^{pitch}$ and the bias $\Delta\theta_x^{pitch}$ and a relation between the measurement reading $\theta_y^{pitch}$ and the bias $\Delta\theta_y^{pitch}$, expressed as:

$$\begin{cases} \theta_x^{pitch} = \Delta\theta_x^{pitch} - \arcsin(t_4\cos\alpha - t_6\sin\alpha) \\ \theta_y^{pitch} = \Delta\theta_y^{pitch} - \arcsin(-t_4\sin\alpha - t_6\cos\alpha) \end{cases};$$

changing a two-axis level degree of the dual-axis level sensor to obtain $(\theta_x^{pitch}, \theta_y^{pitch})$ and $(t_4, t_6)$ under different two-axis level degrees; and plugging the $(\theta_x^{pitch}, \theta_y^{pitch})$ and $(t_4, t_6)$ under different two-axis level degrees into the relation between the measurement reading $\theta_x^{pitch}$ and the bias $\Delta v_x^{pitch}$ and the relation between the measurement reading, $\theta_y^{pitch}$ and the bias $\Delta\theta_y^{pitch}$ to obtain the angle $\alpha$, the bias $\Delta\theta_x^{pitch}$ and the bias $\Delta\theta_y^{pitch}$;

In some embodiments, the first side surface is a front surface of the hexahedron, and the second side surface is a right surface of the hexahedron.

Compared to the prior art, this application has the following beneficial effects.

1. By means of the two-axis level degree measured by the dual-axis level sensor, the method provided herein enables a continuous orientation survey of a single astronomical object and overcomes problems caused by astronomical predictions and attitude changes when the servo star sensor switches between multiple astronomical objects, so as to allow a long-term and continuous orientation survey with high update rate based on miss distance after successfully capturing one astronomical object, eliminating the need for simultaneous tracking of multiple astronomical objects and reducing the number of observed astronomical objects. The orientation method provided herein is particularly suitable for the observation and tracking of a single target in the day time, and can also use obvious targets such as the sun for attitude measurement, simplifying the photoelectric detection and enhancing the data update rate and measurement accuracy for the astronomical orientation.

2. The orientation method provided herein proposes a simple and effective mathematical modeling strategy of the reference system, which greatly reduces the complexity of calibration parameters. Specifically, when constructing the quasi-horizontal reference system, one axis is allowed to coincide with a projection of a normal vector of one side surface of the hexahedron reference system to omit an orientation variable. When constructing a relationship between the dual-axis level sensor reference system and the hexahedron reference system, the relationship is simplified to an orientation error, and the two-axis non-levelness error is incorporated into the bias of a level reading to reduce the data collection required for calibration.

3. In the orientation method provided herein, the hexahedron reference system is measured by means of the autocollimation of the theodolite, and the quasi-horizontal reference system is measured by the dual-axis level sensor.

Then structural parameters of the quasi-horizontal reference system and the hexahedron reference system can be calibrated according to the pitch angle measured by the theodolite and the reading of the dual-axis level sensor. Accordingly, with the help of the theodolite, the collection of all calibrated data can be completed, simplifying the calibration process.

In the drawings: 1, servo star sensor; 2, hexahedron reference; 3, first theodolite; 4, second theodolite; and 5, data recording computer.

DETAILED DESCRIPTION OF EMBODIMENTS

The disclosure will be clearly and completely described below with reference to the accompanying drawings and embodiments.

Figure 1:
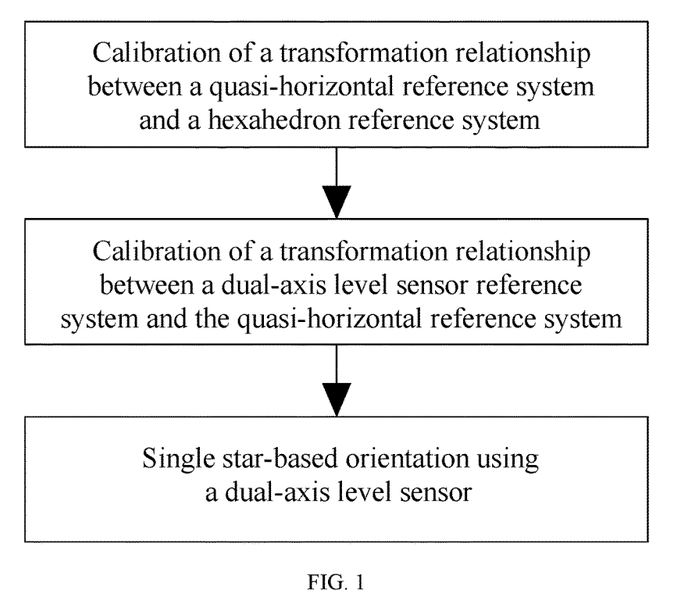
FIG. 1 is a flow chart of a single star-based orientation method using a dual-axis level sensor.

As shown in the flow chart in FIG. 1, a single star-based orientation method using a dual-axis level sensor includes a first calibrating process, a second calibrating process and an actual calculating process. A key of the single star-based orientation is to project an observed single astronomical object onto a "virtual" horizontal plane (quasi-horizontal plane) via a dual-axis level sensor to obtain an azimuth angle of the projection, which is then compared with that in an inertial reference system. An azimuth angle difference is a current measured azimuth angle.

Specifically, the actual calculating process of the single star-based orientation method is provided, which is described as follows.

(S1) Any two orthogonal side surfaces of a hexahedron on a star sensor are denoted as a first side surface and a second side surface, respectively. A component of a vector $v_{right}$ on an $X_n$-axis of a quasi-horizontal reference system is denoted as $t_4$. A component of the vector $v_{right}$ on a $Z_n$-axis of the quasi-horizontal reference system is denoted as $t_6$. The vector $v^{right}$ is obtained by rotating a normal vector of the second side surface $\overline{v}_{right}$ around the $Z_n$-axis of the quasi-horizontal reference system by a preset azimuth angle $\theta_{dir}^{right}$.

(S2) The $t_4$ and $t_6$ are calculated through the following equations:

$$\begin{cases} t_4 = -\left(\sin\alpha\sin\left(\Delta\theta_x^{pitch} - \theta_x^{pitch}\right) + \cos\alpha\sin\left(\Delta\theta_y^{pitch} - \theta_y^{pitch}\right)\right) \\ t_6 = \left(\cos\alpha\sin\left(\Delta\theta_x^{pitch} - \theta_x^{pitch}\right) - \sin\alpha\sin\left(\Delta\theta_y^{pitch} - \theta_y^{pitch}\right)\right) \end{cases}$$

wherein $\alpha$ is an angle between an $X_s$-axis of a dual-axis level sensor reference system and an X-axis of a hexahedron reference system on the star sensor. $\theta_x^{pitch}$ is a measurement reading of the dual-axis level sensor on the $X_s$-axis; $\theta_y^{pitch}$ is a measurement reading of the dual-axis level sensor on a $Y_s$-axis of the dual-axis level sensor reference system. $\Delta\theta_x^{pitch}$ is a bias of the dual-axis level sensor on the $X_s$-axis. $\Delta\theta_y^{pitch}$ is a bias of the dual-axis level sensor on the $Y_s$-axis.

(S3) An observed vector of a single astronomical object in the hexahedron reference system is denoted as $v_{PRI}$. A reference vector of the single astronomical object in an inertial reference system is denoted as $v_{GND}$, where the reference vector of the single astronomical object is obtained from a star catalog, and the $v_{GND}$ and $v_{PRI}$ satisfy the following equation:

$$R_z(\theta_z) \cdot R_x(\theta_x) \cdot R_y(\theta_y) \cdot v_{GND} = v_{PRI}$$

where $R_y(\theta_y)$ denotes that the reference vector $v_{GND}$ rotates around a Y-axis of the hexahedron reference system by an azimuth angle $\theta_y$. $R_x(\theta_x)$ denotes that the reference vector $v_{GND}$ rotates around the X-axis of the hexahedron reference system by a pitch angle $\theta_x$. $R_z(\theta_z)$ denotes that the reference vector $v_{GND}$ rotates around a Z-axis of the hexahedron reference system by a roll angle $\theta_z$.

(S4) The pitch angle $\theta_x$ and the roll angle $\theta_z$ are calculated according to the $t_4$ and $t_6$ through the following equations:

$$\begin{cases} \theta_x = -\arcsin t_6 \\ \theta_z = -\arcsin(t_4/\cos\theta_x) \end{cases}.$$

It should be noted that a transformation matrix $R_{GND2PRI}$ from the quasi-horizontal reference system to the hexahedron reference system is described according to a rotation sequence of rotating around the Y-axis by the $\theta_y$, rotating around the X-axis by the $\theta_x$ and rotating around the Z-axis by the $\theta_z$ (2-1-3 rotation) to obtain relations as:

$$\begin{cases} t_4 = \cos\theta_x \sin\theta_z \\ t_6 = \sin\theta_x \end{cases}.$$

The equations for computing the pitch angle $\theta_x$ and the roll angle $\theta_z$ are obtained through an arcsin function in accordance with the above relations.

(S5) $v_{GND0} = R_x(-\theta_x) \cdot R_z(-\theta_z) \cdot v_{PRI}$ is made. According to a rotation sequence of rotating around the Z-axis by the $\theta_z$, rotating around the X-axis by the $\theta_x$ and rotating around the Y-axis by the $\theta_z$ (3-1-2 rotation), $v_{GND} R_y(-\theta_y) \cdot v_{GND0}$ is obtained. The azimuth angle $\theta_y$ is calculated through the following equation to complete a single star-based orientation:

$$\theta_y = \arctan 2\left(\frac{v1 \cdot v6 - v3 \cdot v4}{v4^2 + v6^2}, \frac{v1 \cdot v4 - v3 \cdot v6}{v4^2 + v6^2}\right)$$

where $[v1\ v2\ v3]^T = v_{GND} \cdot v_1 \cdot v3$ are components of the $v_{GND}$ on the X-axis, the Y-axis and the Z-axis, respectively. $[v4\ v5\ v6]^T = v_{GND0}$. v4-v6 are components of the $v_{GND0}$ on the $X_n$-axis, the $Y_n$-axis and the $Z_n$-axis, respectively.

A first calibrating process shown in FIG. 1 is a calibration of a transformational relationship between the quasi-horizontal reference system and the hexahedron reference system.

Figure 2:
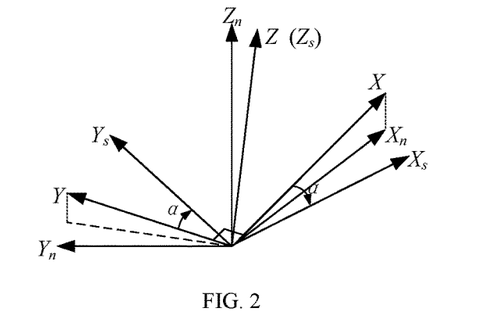
FIG. 2 schematically depicts a relationship between a dual-axis level sensor reference system, a hexahedron reference system and a quasi-horizontal reference system.

The quasi-horizontal reference system is constructed according to an angle information of a normal vector of the first side surface $v_{front}$ and the normal vector of the second side surface (considering that the first side surface is a front side surface and the second side surface is a right side surface). Referring to FIG. 2, the $X_n$-axis of the quasi-horizontal reference system is defined as a projection of the X-axis of the hexahedron reference system on a horizontal plane. A $Y_n$-axis of the quasi-horizontal reference system is defined such that the $Y_n$-axis of the quasi-horizontal reference system is constrained by orthogonality and lies in the horizontal plane, namely, the $Y_n$-axis is orthogonal to the $X_n$-axis on the horizontal plane and a $Z_n$-axis of the quasi-horizontal reference system satisfies a right-hand rule, and has a general upward pointing direction.

A normal pitch angle $\theta_{pitch}^{front}$ of the first side surface and a normal pitch angle $\theta_{pitch}^{front}$ of the second side surface are measured by a first theodolite and a second theodolite, respectively. An axis of a measuring lens barrel of the first theodolite coincides with a normal of the first side surface of the hexahedron, and an axis of a measuring lens barrel of the second theodolite coincides with a normal of the second side surface of the hexahedron. In the quasi-horizontal reference system, the normal vector $v_{front}$ is expressed as $$v_{front} = R_y(\theta_{pitch}^{front}) \cdot \begin{bmatrix} 0 \\ 0 \\ 1 \end{bmatrix} = \begin{bmatrix} vf1 \\ 0 \\ vf3 \end{bmatrix}$$

where $R_y(\theta_{pitch}^{front})$ denotes that a vector $[0\ 0\ 1]$ rotates around a $Y_n$-axis by the normal pitch angle $\theta_{pitch}^{front}$. $vf1$, 0 and $vf3$ are components of the second normal vector $v_{front}$ on the $X_n$-axis, the $Y_n$-axis and the $Z_n$-axis, respectively. The normal vector $\bar{v}_{right}$ without rotating by the preset azimuth angle $\theta_{dir}^{right}$ is expressed as:

$$\bar{v}_{right} = R_y(\theta_{pitch}^{right}) \cdot \begin{bmatrix} 0 \\ 0 \\ 1 \end{bmatrix} = \begin{bmatrix} vr1 \\ 0 \\ vr3 \end{bmatrix},$$

where $R_y(\theta_{pitch}^{right})$ denotes that the vector $[0\ 0\ 1]$ rotates around the $Y_n$-axis of the quasi-horizontal reference system by the normal pitch angle $\theta_{pitch}^{right}$. $vr1$, 0 and $vr3$ are components of the normal vector $\bar{v}_{right}$ on the $X_n$-axis, $Y_n$-axis and $Z_n$-axis, respectively.

The vector $v_{right}$ is obtained by rotating the vector $\bar{v}_{right}$ by the preset azimuth and the vector $v_{right}$ is expressed as follows:

$$v_{right} = R_z(\theta_{dir}^{right}) \cdot \begin{bmatrix} vr1 \\ 0 \\ vr3 \end{bmatrix} = \begin{bmatrix} vr1 \cdot \cos\theta_{dir}^{right} \\ -vr1 \cdot \sin\theta_{dir}^{right} \\ vr3 \end{bmatrix}$$

where $R_z(\theta_{dir}^{right})$ denotes that a vector $[vr1\ 0\ vr3]$ rotates around the $Z_n$-axis by the preset azimuth angle $\theta_{dir}^{right}$.

According to an orthogonal relationship between the normal vector $v_{front}$ and the normal vector $v_{right}$ ($v_{front} \perp v_{right}$), the following equation is obtained:

$$\theta_{dir}^{right} = a\cos\left(\frac{-vf3 \cdot vr3}{vf1 \cdot vr1}\right).$$

A third normal vector $v_{up}$ of a third surface is obtained according to a cross product, expressed as $$v_{up} = v_{right} \times v_{front}.$$

Therefore, the transformation matrix $R_{GND2PRI}$ is expressed as:

$$R_{GND2PRI} = [v_{front}\ v_{right}\ v_{up}].$$

A second calibrating process shown in FIG. 1 is a calibration of a transformational relationship between the dual-axis level sensor reference system and the quasi-horizontal reference system.

Referring to FIG. 2, an angle between the $X_s$-axis and the X-axis is assumed as $\alpha$. Since the dual-axis level sensor reference system is coplanar with the hexahedron reference system, an angle between the $Y_s$-axis and the X-axis is $\alpha+\pi/2$. A direction vector of the $X_s$-axis in the hexahedron reference system is expressed as $[\cos \alpha\ 0 -\sin \alpha]$ and a direction vector of the $Y_s$-axis in the hexahedron reference system is expressed as $[-\sin \alpha\ 0 -\cos \alpha]$.

A transpose matrix of the transformation matrix $R_{GND2PRI}$ is obtained, expressed as follows:

$$R_{PRI2GND} = R_{GND2PRI}^T = \begin{bmatrix} t_1 & t_2 & t_3 \\ t_4 & t_5 & t_6 \\ t_7 & t_8 & t_9 \end{bmatrix}$$

where T represents a transposition operation. $t_1$-$t_9$ are elements of the transformation matrix $R_{GND2PRI}$.

A direction vector $v_x$, of the $X_s$-axis in the quasi-horizontal reference system is acquired, expressed as follows:

$$v_{X_s} = \begin{bmatrix} t_1\cos\alpha - t_3\sin\alpha \\ t_4\cos\alpha - t_6\sin\alpha \\ t_7\cos\alpha - t_9\sin\alpha \end{bmatrix}.$$

A direction vector $v_y$, of the $Y_s$-axis in the quasi-horizontal reference system is acquired, expressed as follows:

$$v_{Y_s} = \begin{bmatrix} -t_1\sin\alpha - t_3\cos\alpha \\ -t_4\sin\alpha - t_6\cos\alpha \\ -t_7\sin\alpha - t_9\cos\alpha \end{bmatrix}.$$

The measurement reading of the direction vector $v_x$, on the dual-axis level sensor is $\theta_x^{pitch}$. The measurement reading of the direction vector $v_y$, on the dual-axis level sensor is $\theta_y^{pitch}$. The bias of the dual-axis level sensor on the Xs-axis is $\Delta\theta_x^{pitch}$. The bias of the dual-axis level sensor on the Ys-axis is $\Delta\theta_y^{pitch}$.

Relations between $t_4$ and $t_6$ according to the direction vector $v_x$, and the direction vector $v_y$, is built, expressed as follows:

$$\begin{cases} \sin(\Delta\theta_x^{pitch} - \theta_x^{pitch}) = t_4\cos\alpha - t_6\sin\alpha \\ \sin(\Delta\theta_y^{pitch} - \theta_y^{pitch}) = -t_4\sin\alpha - t_6\cos\alpha \end{cases}.$$

According to the relations between $t_4$ and $t_6$, a relation between the measurement reading $\theta_x^{pitch}$ and the bias $\Delta\theta_x^{pitch}$ and a relation between the measurement reading $\theta_y^{pitch}$ and the bias $\Delta\theta_y^{pitch}$ are obtained, expressed as:

$$\begin{cases} \theta_x^{pitch} = \Delta\theta_x^{pitch} - \arcsin(t_4\cos\alpha - t_6\sin\alpha) \\ \theta_y^{pitch} = \Delta\theta_y^{pitch} - \arcsin(-t_4\sin\alpha - t_6\cos\alpha) \end{cases}.$$

Figure 3:
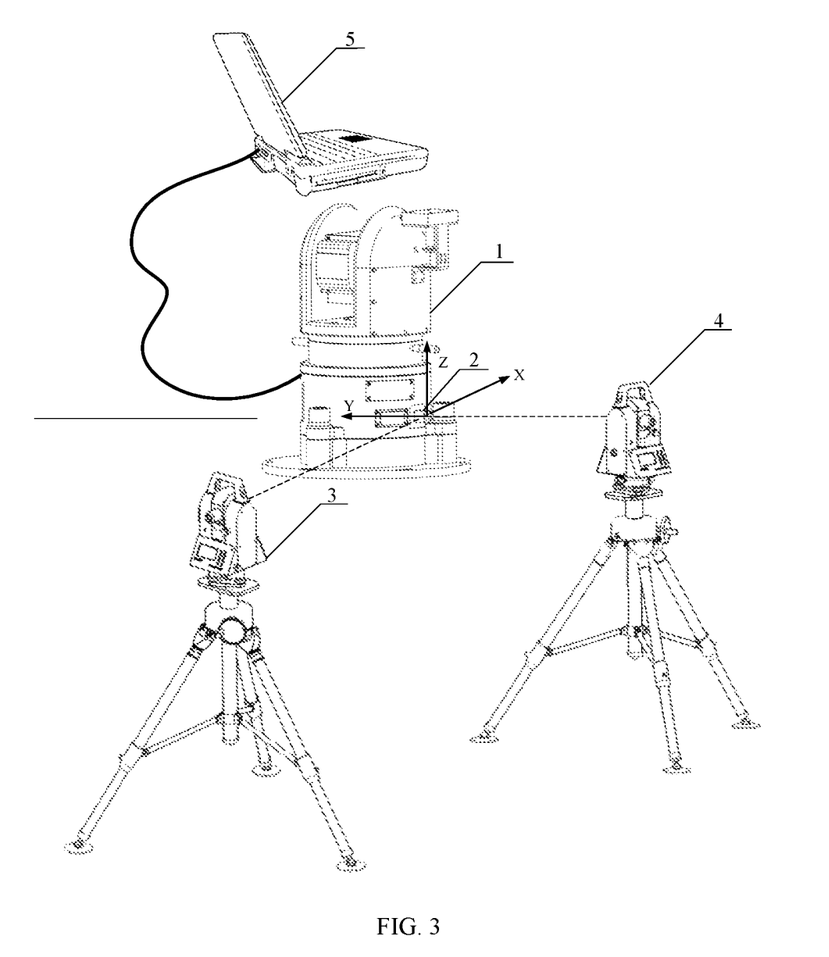
FIG. 3 schematically depicts a calibration of the dual-axis level sensor reference system and the quasi-horizontal reference system.

The star sensor is placed under a calibration device, as shown in FIG. 3. A two-axis level degree of the dual-axis level sensor is changed to obtain $(\theta_x^{pitch}, \theta_y^{pitch})$ and $(t_4, t_6)$ under different two-axis level degrees and then multiple mapping relations of $(\theta_x^{pitch}, \theta_x^{pitch}) \to (t_4, t_6)$ are obtained. The $(\theta_x^{pitch}, \theta_y^{pitch})$ and $(t_4, t_6)$ under different two-axis level degrees into the relation between the measurement reading $\theta_x^{pitch}$ and the bias $\Delta\theta_x^{pitch}$ and the relation between the measurement reading $\theta_y^{pitch}$ and the bias $\Delta\theta_y^{pitch}$ are plugged to obtain the angle $\alpha$, the bias $\Delta\theta_x^{pitch}$ and the bias $\Delta\theta_y^{pitch}$.

In the orientation method provided herein, the hexahedron reference system is measured by means of the autocollimation of the theodolite, and the quasi-horizontal reference system is measured by the dual-axis level sensor. Then structural parameters of the quasi-horizontal reference system and the hexahedron reference system can be calibrated according to the pitch angle measured by the theodolite and the reading of the dual-axis level sensor. Accordingly, with the help of the theodolite, the collection of all calibrated data can be completed, simplifying the calibration process.

In summary, the single star-based orientation method provided herein can be described as follows.

The first calibrating process is performed as follows. Normal vectors of two orthogonal side surfaces on the hexahedron of the star sensor are measured to obtain the transformational relationship between the quasi-horizontal reference system and the hexahedron reference system. The $X_n$-axis of the quasi-horizontal reference system is defined as a projection of the X-axis of the hexahedron reference system in a horizontal plane. The $Y_n$-axis is orthogonal to the $X_n$-axis on the horizontal plane and the $Z_n$-axis of the quasi-horizontal reference system satisfies a vertically-upward right-hand rule.

The second calibrating process is performed as follows. By means of the mapping relation between the measurement reading of the dual-axis level sensor and normal measurements of the theodolites, the transformational relationship between the dual-axis level sensor reference system and the quasi-horizontal reference system is obtained. After the second calibrating process, the angle between an $X_s$-axis of a dual-axis level sensor reference system and an X-axis of a hexahedron reference system, the bias of the dual-axis level sensor on the $X_s$-axis, and the bias of the dual-axis level sensor on the $Y_s$-axis are obtained.

The actual calculating process is performed as follows. By means of an attitude information of the $X_s$-axis and the $Y_s$-axis obtained in the second calibrating process, the vectors expressed in the quasi-horizontal reference system is obtained through the observation vector of the single astronomical object. An azimuth angle difference between the quasi-horizontal reference system and the inertial reference system, that is orientation information, is obtained by combining with the reference vector of the single astronomical object in the inertial reference system from the star catalog.

This application eliminates an uncertainty of solution when solving for an attitude with a single vector by means of the information from the dual-axis level sensor. Furthermore, a quasi-horizontal reference system is constructed through the 2-1-3 rotation. Vectors of the single astronomical object are projected onto the quasi-horizontal reference system. By comparing the azimuth angle difference between a projected azimuth angle and an azimuth angle in the inertial reference system, the single star-based orientation of is completed.

Mentioned above are merely some embodiments of this disclosure, which are not intended to limit the disclosure. It should be understood that any changes, replacements and modifications made by those killed in the art without depart-

What is claimed is:

1. A single star-based orientation method using a dual-axis a level sensor and a calibration device, the calibration device comprising a star sensor, a hexahedron connected onto the star sensor, a first theodolite, a second theodolite and a processor:

the method comprising:

collecting, by the dual-axis level sensor, a non-level degree $\theta_x^{pitch}$ on an $X_s$-axis of a dual-axis level sensor reference system and a non-level degree $\theta_y^{pitch}$ on a $Y_s$-axis of the dual-axis level sensor reference system;

obtaining, at the processor, a vector $v_{right}$ by rotating a normal vector of a second side surface of the hexahedron around a $Z_n$-axis of a quasi-horizontal reference system by a preset azimuth angle $\theta_{dir}^{right}$; wherein the hexahedron includes a first side surface and the second side surface which are orthogonal;

calculating, at the processor, $t_4$ and $t_6$ through the following equations:

$$\begin{cases} t_4 = -\left(\sin\alpha\sin\left(\Delta\theta_x^{pitch} - \theta_x^{pitch}\right) + \cos\alpha\sin\left(\Delta\theta_y^{pitch} - \theta_y^{pitch}\right)\right) \\ t_6 = \left(\cos\alpha\sin\left(\Delta\theta_x^{pitch} - \theta_x^{pitch}\right) - \sin\alpha\sin\left(\Delta\theta_y^{pitch} - \theta_y^{pitch}\right)\right) \end{cases};$$

wherein $t_4$ is a component of the vector $v_{right}$ on an $X_n$-axis of the quasi-horizontal reference system; and $t_6$ is a component of the vector $v_{right}$ on the $Z_n$-axis of the quasi-horizontal reference system; $\alpha$ is an angle between the $X_s$-axis of the dual-axis level sensor reference system and an X-axis of a hexahedron reference system on the star sensor; $\Delta\theta_x^{pitch}$ is a bias of the dual-axis level sensor on the $X_s$-axis; and $\Delta\theta_y^{pitch}$ is a bias of the dual-axis level sensor on the $Y_s$-axis;

observing and measuring, by the star sensor, a single astronomical object to obtain an observation vector $v_{PRI}$ in the hexahedron reference system and obtain a reference vector $v_{GND}$ of the single astronomical object in an inertial reference system from a star catalog, wherein the $v_{GND}$ and $v_{PRI}$ satisfy the following equation:

$R_z(\theta_z) \cdot R_x(\theta_x) \cdot R_y(\theta_y) \cdot v_{GND} = v_{PRI}$;

wherein $R_y(\theta_y)$ denotes that the reference vector $v_{GND}$ rotates around a Y-axis of the hexahedron reference system by an azimuth angle $\theta_y$; $R_x(\theta_x)$ denotes that the reference vector $v_{GND}$ rotates around the X-axis of the hexahedron reference system by a pitch angle $\theta_x$; and $R_z(\theta_z)$ denotes that the reference vector $v_{GND}$ rotates around a Z-axis of the hexahedron reference system by a roll angle $\theta_z$;

calculating, at the processor, the pitch angle $\theta_x$ and the roll angle $\theta_z$ according to the $t_4$ and $t_6$ through the following equations:

$$\begin{cases} \theta_x = -\arcsin t_6 \\ \theta_z = -\arcsin(t_4/\cos\theta_x) \end{cases};$$

and obtaining, at the processor, $v'_{GND} = R_y(-\theta_y) \cdot v_{GND}$ according to $v_{GND0} = R_x(-\theta_x) \cdot R_z(-\theta_z) \cdot v_{PRI}$; and calculating, at the processor, the azimuth angle $\theta_y$ through the following equation $$\theta_y = \arctan 2\left(\frac{v1 \cdot v6 - v3 \cdot v4}{v4^2 + v6^2}, \frac{v1 \cdot v4 + v3 \cdot v6}{v4^2 + v6^2}\right);$$

wherein $[v1\ v2\ v3]^T = v'_{GND}$; $v1$–$v3$ are components of the $v'_{GND}$ on three axes of the inertial reference system, respectively; $[v4\ v5\ v6]^T = v_{GND0}$; and $v4$–$v6$ are components of the $v_{GND0}$ on the $X_n$-axis, the $Y_n$-axis and the $Z_n$-axis, respectively; and tracking, by the star sensor, the single astronomical object according to the calculated azimuth angle $\theta_y$ thereby completing the single star-based orientation.

2. The single star-based orientation method of claim 1, wherein the preset azimuth angle $\theta_{dir}^{right}$ is set at the processor through steps of:

defining the $X_n$-axis of the quasi-horizontal reference system as a projection of the X-axis of the hexahedron reference system on a horizontal plane; defining the $Y_n$-axis of the quasi-horizontal reference system such that the $Y_n$-axis is orthogonal to the $X_n$-axis on the horizontal plane and the $Z_n$-axis of the quasi-horizontal reference system satisfies a right-hand rule, and has a general upward pointing direction;

measuring, by the first theodolite and the second theodolite, a normal pitch angle $\theta_{pitch}^{front}$ of the first side surface and a normal pitch angle $\theta_{pitch}^{right}$ of the second side surface, respectively; wherein in the quasi-horizontal reference system, a normal vector $v_{front}$ of the first side surface is expressed as:

$$v_{front} = R_y(\theta_{pitch}^{front}) \cdot \begin{bmatrix} 0 \\ 0 \\ 1 \end{bmatrix} = \begin{bmatrix} vf1 \\ 0 \\ vf3 \end{bmatrix};$$

wherein $R_y(\theta_{pitch}^{front})$ denotes that a vector $[0\ 0\ 1]$ rotates around the $Y_n$-axis of the quasi-horizontal reference system by the normal pitch angle $\theta_{pitch}^{front}$; and $vf1$, $0$ and $vf3$ are components of the normal vector $v_{front}$ on the $X_n$-axis, $Y_n$-axis and $Z_n$-axis, respectively;

a normal vector $\overline{v}_{right}$ of the second side surface without rotating by the preset azimuth angle $\theta_{dir}^{right}$ is expressed as:

$$\overline{v}_{right} = R_y(\theta_{pitch}^{right}) \cdot \begin{bmatrix} 0 \\ 0 \\ 1 \end{bmatrix} = \begin{bmatrix} vr1 \\ 0 \\ vr3 \end{bmatrix};$$

wherein $R_y(\theta_{pitch}^{right})$ denotes that the vector $[0\ 0\ 1]$ rotates around the $Y_n$-axis of the quasi-horizontal reference system by the normal pitch angle $\theta_{pitch}^{right}$; and $vr1$, $0$ and $vr3$ are components of the normal vector $\overline{v}_{right}$ on the $X_n$-axis, $Y_n$-axis and $Z_n$-axis, respectively;

supposing that the vector $v_{right}$ is obtained by rotating the vector $\overline{v}_{right}$ by the preset azimuth angle $\theta_{dir}^{right}$ and expressing the vector $v_{right}$ as follows:

$$v_{right} = R_z(\theta_{dir}^{right}) \cdot \begin{bmatrix} vr1 \\ 0 \\ vr3 \end{bmatrix} = \begin{bmatrix} vr1 \cdot \cos\theta_{dir}^{right} \\ -vr1 \cdot \sin\theta_{dir}^{right} \\ vr3 \end{bmatrix};$$

wherein $R_z(\theta_{dir}^{right})$ denotes that a vector [vr1 0 vr3] rotates around the $Z_n$-axis by the preset azimuth angle $\theta_{dir}^{right}$; and according to an orthogonal relationship between the normal vector $v_{front}$ and the normal vector $v_{right}$, obtaining the following equation:

$$\theta_{dir}^{right} = a\cos\left(\frac{-vf3 \cdot vr3}{vf1 \cdot vr1}\right).$$

3. The single star-based orientation method of claim 2, wherein an axis of a measuring lens barrel of the first theodolite coincides with a normal of the first side surface of the hexahedron, and an axis of a measuring lens barrel of the second theodolite coincides with a normal of the second side surface of the hexahedron.

4. The single star-based orientation method of claim 1, wherein the angle α, the bias $\Delta\theta_x^{pitch}$ and the bias $\Delta\theta_y^{pitch}$ are obtained at the processor through steps of:

defining the $X_n$-axis of the quasi-horizontal reference system as a projection of the X-axis of the hexahedron reference system on a horizontal plane; defining a $Y_n$-axis of the quasi-horizontal reference system such that the $Y_n$-axis is orthogonal to the $X_n$-axis on the horizontal plane and the $Z_n$-axis of the quasi-horizontal reference system satisfies a vertically-upward right-hand rule; allowing the dual-axis level sensor reference system to be coplanar with the hexahedron reference system; and expressing a direction vector of the $X_s$-axis in the hexahedron reference system as [cos α 0 −sin α] and a direction vector of the $Y_s$-axis in the hexahedron reference system as [−sin α 0 −cos α];

denoting a normal vector of the first side surface as $v_{front}$; and obtaining a normal vector $v_{up}$ of a third side surface orthogonal to both the first side surface and the second side surface by cross product, expressed as:

$v_{up} = v_{right} \times v_{front}$;

obtaining a transformation matrix $R_{GND2PRI}$ from the quasi-horizontal reference system to the hexahedron reference system, expressed as:

$R_{GND2PRI} = [v_{front} v_{right} v_{up}]$;

obtaining a transpose matrix of the transformation matrix $R_{GND2PRI}$, expressed as:

$$R_{PRI2GND} = R^T_{GND2PRI} = \begin{bmatrix} t_1 & t_2 & t_3 \\ t_4 & t_5 & t_6 \\ t_7 & t_8 & t_9 \end{bmatrix};$$

wherein T represents a transposition operation; and $t_1$-$t_9$ are elements of the transformation matrix $R_{GND2PRI}$;

acquiring a direction vector $v_{X_s}$ of the $X_s$-axis in the quasi-horizontal reference system, expressed as:

$$v_{X_s} = \begin{bmatrix} t_1 \cos\alpha - t_3 \sin\alpha \\ t_4 \cos\alpha - t_6 \sin\alpha \\ t_7 \cos\alpha - t_9 \sin\alpha \end{bmatrix};$$

acquiring a direction vector $v_{Y_s}$ of the $Y_s$-axis in the quasi-horizontal reference system, expressed as:

$$v_{Y_s} = \begin{bmatrix} -t_1 \sin\alpha - t_3 \cos\alpha \\ -t_4 \sin\alpha - t_6 \cos\alpha \\ -t_7 \sin\alpha - t_9 \cos\alpha \end{bmatrix};$$

building relations between $t_4$ and $t_6$ according to the direction vector $v_{X_s}$ and the direction vector $v_{Y_s}$, expressed as:

$$\begin{cases} \sin(\Delta\theta_x^{pitch} - \theta_x^{pitch}) = t_4 \cos\alpha - t_6 \sin\alpha \\ \sin(\Delta\theta_y^{pitch} - \theta_y^{pitch}) = -t_4 \sin\alpha - t_6 \cos\alpha \end{cases};$$

according to the relations between $t_4$ and $t_6$, obtaining a relation between the measurement reading $\theta_x^{pitch}$ and the bias $\Delta\theta_x^{pitch}$ and a relation between the measurement reading $\theta_y^{pitch}$ and the bias $\Delta\theta_y^{pitch}$, expressed as:

$$\begin{cases} \theta_x^{pitch} = \Delta\theta_x^{pitch} - \arcsin(t_4 \cos\alpha - t_6 \sin\alpha) \\ \theta_y^{pitch} = \Delta\theta_y^{pitch} - \arcsin(-t_4 \sin\alpha - t_6 \cos\alpha) \end{cases};$$

changing a two-axis level degree of the dual-axis level sensor to obtain ($\theta_x^{pitch}$, $\theta_y^{pitch}$) and ($t_4$, $t_6$) under different two-axis level degrees; and plugging the ($\theta_x^{pitch}$, $\theta_y^{pitch}$) and ($t_4$, $t_6$) under different two-axis level degrees into the relation pitch between the measurement reading $\theta_x^{pitch}$ and the bias $\Delta\theta_x^{pitch}$ and the relation between the measurement reading $\theta_y^{pitch}$ and the bias $\Delta\theta_y^{pitch}$ to obtain the angle α, the bias $\Delta\theta_x^{pitch}$ and the bias $\Delta\theta_y^{pitch}$.

\* \* \* \* \*